UNITED STATES PATENT OFFICE 2,462,895

PREPARATION OF MODIFIED POLYMERIC METHYL METHACRYLATE

Joseph L. Quinn, Matawan, N. J., assignor to E. I. du Pont de Nemours & Company, Wilmington, Del., a corporation of Delaware No Drawing. Application January 30, 1945, Serial No. 575,360

8 Claims. (Cl. 260—83)

This invention relates to the preparation of modified polymeric methyl methacrylate and, more particularly, to the preparation of a modified polymeric methyl methacrylate having improved properties for molding purposes.

It is known that, when plasticizers or lubricants are mixed with methyl methacrylate polymers to facilitate rolling and molding, the heat resistance of the polymers is appreciably reduced, thus making them unsuitable for higher temperature applications. Since these polymers usually crack when molded without lubricants, it has not been practical heretofore to eliminate the use of lubricants.

An object of the present invention is to provide a simple and economical method of preparing improved polymeric methyl methacrylate. A further object is to provide a method of preparing modified polymeric methyl methacrylate having increased heat resistance and giving injection molded articles exhibiting an elevated heat distortion temperature and improved optical properties. A still further object is to provide a method of preparing modified polymeric methyl methacrylate molding powders having improved flow properties and faster molding cycles and which may be successfully molded without the use of additional lubricants. Other objects will be apparent from the description of the invention given hereinafter.

The above objects are accomplished according to the present invention by treating a suspension of finely divided polymeric methyl methacrylate in an aqueous medium with an aliphatic mercaptan at an elevated temperature. Preferably, the invention is carried out by adding to a suspension of finely divided polymeric methyl methacrylate in water 0.1%–2.5%, by weight of the polymeric methyl methacrylate, of lauryl mercaptan and thereafter agitating the suspension at a temperature of 100° C.–125° C. under autogenous pressure in a closed vessel in the presence of an inert atmosphere for about fifteen minutes.

After this treatment, the finely divided modified polymeric methyl methacrylate is washed, dried, rolled if desired with or without dyes for coloring, cut and screened in the usual way.

The present invention may be conveniently used as an "after treatment" to the polymerization process disclosed in the copending application of Fletcher and Johnston U. S. Patent No. 2,418,828 filed May 29, 1946, and patented April 15, 1947, and entitled "Polymerization of methyl methacrylate." According to that process, polymerization is carried out by suspending monomeric methyl methacrylate in water containing from 1.0% to 0.005%, by weight of the monomer, of benzoyl peroxide and then polymerizing the methyl methacrylate at a peak temperature above 110° C. and below the depolymerization temperature of the polymer being formed, the temperature of the suspension during the polymerization reaction being controlled so that the temperature increases through the temperature interval of 40° C. to 110° C. in not more than fifteen minutes. The suspension of polymeric methyl methacrylate resulting from this process may then be treated by the addition of the aliphatic mercaptan and subjected while under agitation to an elevated temperature.

The following examples in which all proportions are given by weight unless otherwise noted, illustrate specific embodiments of the invention.

EXAMPLE I

Monomeric methyl methacrylate suspended in water containing benzoyl peroxide as a polymerization catalyst was polymerized, while subjected to agitation, in a reaction vessel equipped with an external heating jacket, the conditions being regulated so that the peak temperature reached by the reaction mixture was above 110° C. but below the depolymerization temperature of the polymer being formed and the temperature of the reaction mixture raised through the interval of 40° C. to 110° C. in less than fifteen minutes. After the polymerization reaction was complete, the polymer suspended in the water was given an after-treatment by adding thereto 0.5%, by weight of of the monomeric methyl methacrylate, of "Lorol" mercaptan and the kettle was flushed with a strong stream of carbon dioxide for two minutes to provide an inert atmosphere. Steam at 15 lbs. pressure was run into the jacket of the kettle to raise the temperature of the suspension of finely divided polymer to 121° C. at which temperature the contents of the kettle were kept for thirteen minutes while being vigorously agitated under autogenous pressure. At the end of this period, the contents of the kettle were cooled, the finely divided polymer separated, washed, and dried.

From the finely divided polymer thus obtained impact bars were molded at 15,000–20,000 lbs. per square inch pressure and a temperature of 225° C.–250° C., the die being heated to above 65° C. The bars were subjected to a thirty minute boiling test and other tests with the results set forth in Table I below.

EXAMPLE II

An interpolymer of 80% methyl metacrylate and 20% ethyl methacrylate as prepared according to the polymerization procedure given in Example I. 0.5%, by the combined weights of the monomers forming the interpolymer, of "Lorol" mercaptan was added to the reaction kettle for an after treatment of fifteen minutes at 121° C. From the modified interpolymer thus obtained impact bars were molded under the conditions set forth in Example I and the properties of the impact bars as shown by the various tests are indicated in Table I below.

For purposes of control, impact bars were molded from an interpolymer of the same composition as that given in Example II but the interpolymer was not given the treatment with the "Lorol" mercaptan. The results obtained by testing these impact bars are likewise given in Table I.

The improved heat resistance of these compounds is measured as the resistance of injection molded articles to shrinkage and distortion when subjected to temperatures in the neighborhood of 95° C. Polymers modified in accordance with the present invention showed strain-release temperatures up to 25° C. and more than the unmodified polymers. The strain-release temperature is an arbitrary test based on the measure of the change in dimensions of a molded bar (5" x ½" x ¼") resulting from exposure for a definite length of time to a definite temperature. The change in dimensions is usually a contraction due to the release of strains set up on the piece during molding and the temperature of the test bar is raised step-wise in 20° C. increments. The temperature at which this change measured along the length of the bar is 1% of the original length, is defined as the strain-release temperature.

The percent shrinkage, as set forth in Table I, is the change in length of the impact bar (5" x ½" x ¼") after the bar has been completely immersed in boiling water for thirty minutes.

The action of the modifier seems to be one of stabilization against depolymerization of the polymer. Evidence to support this view lies in the fact that the solution viscosity, when measured in 1% solution in chloroform, of an unmodified methyl methacrylate polymer decreases remarkably on rolling, whereas the viscosity of the same polymer which has been subjected to after-treatment with 0.5% of "Lorol" mercaptan did not change appreciably when rolled under the same conditions. The higher non-polymer content, that is, the amount of unrecovered polymer upon precipitation of a polymer solution with a non-solvent, of the unmodified polymer after rolling is further evidence to support this view. Table II shows the data obtained by subjecting polymer taken from the same batch to rolling under identical conditions, part of the polymer having been given an after-treatment with 0.5% "Lorol" mercaptan and part not having been so treated.

Table II

| | Untreated Polymer | | Polymer Treated with 0.5% "Lorol" Mercaptan | |
|---|---|---|---|---|
| | Before Rolling | After Rolling | Before Rolling | After Rolling |
| Viscosity (time of efflux of 1% CHCl₃ solution through capillary, in secs.) | 46.4 | 44.6 | 46.2 | 46.0 |
| Per Cent Non-Polymer | 1.0 | 4.4 | 1.5 | 1.2 |

The procedure of the present invention results in a homogeneous dispersion of modifier in polymer and this mixture may be rolled with pigments without danger of degrading the polymer. On the other hand, when it is attempted to incorporate the modifier with the polymer on rolls instead of in kettle, it is difficult to avoid some depolymerization during the operation and, in addition, a non-uniform dispersion of the modifier in the polymer may result.

The aliphatic mercaptan, of course, may be added at the beginning of the polymerization reaction but the polymers obtained thereby tend to be clustered and non-uniform. This may be overcome only by reducing the amount of modifier used to a minor percentage, for example, less than 0.1% by weight of lauryl mercaptan, which results in loss of the higher heat resistance obtained in polymers made according to the present invention, as well as insufficient dispersion of the modifier to prevent depolymerization in subsequent operations. Further, the optical properties of the molding powders are in some instances impaired by incorporating the modifier with the monomer before the polymerization.

It will be understood that the foregoing Examples are merely illustrative and the present invention broadly comprises treating a finely divided polymeric methyl methacrylate in an aqueous medium with an aliphatic mercaptan at an elevated temperature.

The "Lorol" mercaptan used in the examples is a mixture of straight-chain (normal) mercaptans of even numbers of carbon atoms from 8 to 18,

TABLE I

| Example | I | II | Control |
|---|---|---|---|
| Other monomer | | 10% ethyl methacrylate | 10% ethyl methacrylate. |
| Per cent modifier | 0.5% "Lorol" mercaptan | 0.5% "Lorol" mercaptan | none. |
| After-treatment minutes | 13 | 15 | |
| After-treatment temperature, °C | 121° | 121° | |
| Flow temperature °C. (A. S. T. M. D569–43) | 166° | 167° | 151°. |
| Flexural strength p. s. i. (A. S. T. M. D650–42T) | 20,300 | 19,410 | 16,390. |
| Strain-release Temp., °C | 106° | 100° | 81°. |
| Per cent shrinkage in 30 minute boiling test | 0.0 | 0.4 | 12.4. | inclusive, with lauryl mercaptan preponderating. Lauryl mercaptan is the preferred specific mercaptan for use in this invention but "Lorol" mercaptan is substantially equivalent to it for purposes of this invention and is more conveniently available for commercial operations. Other satisfactory mercaptans include stearyl mercaptan and mercapto-ethanol. Since the treatment of this invention is carried out under autogenous pressure in a closed container, the volatility of the mercaptan is no particular detriment during the treatment and thus the mercaptans of the lower aliphatic alcohols may be employed and, in general, aliphatic mercaptans containing from 1 to 18 carbon atoms, inclusive, are adapted for use in this invention.

It has been found that inorganic compounds containing an —SH radical also function according to this invention, e. g., sodium sulfhydrate. These compounds, however, are not as desirable to handle because of their more rapid hydrolysis during the after-treatment in the kettle.

The proportion of the modifier, based on the weight of polymer being treated, is not sharply critical within the limits of 0.1% to 2.5% although it is preferred to use from 0.2% to 0.5% since the use of more than 0.5% of the mercaptan does not appear to improve the heat resistance of the polymer appreciably while less than 0.2% is hardly sufficient to obtain all of the advantages from the present invention.

The temperature at which the polymer is treated in the kettle may be varied considerably but it should be appreciably below the flow temperature of the polymer (A. S. T. M. D569-43) and, as a practical rule, from 30° C. to 50° C. below the flow temperature. This means that normally a temperature in the neighborhood of 100° C. to 125° C. will be employed.

The time of the after-treatment is not critical but would certainly be in the range of five minutes to forty-five minutes except in most unusual cases and generally would be from ten minutes to thirty minutes with the range of ten minutes to twenty minutes more specifically preferred. The pressure in the kettle is autogenous, the actual value at the temperatures normally employed being about 10 lbs. per square inch.

The present invention is designed for application to finely divided polymeric methyl methacrylate. The precise particle size is not important and will ordinarily be governed by considerations not related to the present invention. Since the invention is particularly designed for the improvement of polymers to be used for molding purposes and such polymers are usually prepared in granular form, it follows that the polymer treated is most often in granular form but the invention is applicable to polymer in particle size from 30 mesh to 100 mesh or even finer. If the particle size is too great, difficulty with uniformity of the dispersion of the modifier in the polymer may be encountered while, at the other extreme, the practical difficulty of handling extremely finely divided polymer is encountered.

As will be understood by those skilled in the art, the modified polymers according to the present invention may be used without any additional ingredients to produce clear products, or pigments and other addition agents may be incorporated either in the kettle or by rolling afterwards.

The present invention is not limited in its application to straight methyl methacrylate polymer. The term polymeric methyl methacrylate is used to include not only polymers of methyl methacrylate by itself, but also copolymers of methyl methacrylate with other polymerizable monomers, and in which methyl methacrylate predominates. Copolymers of methyl methacrylate with both methacrylic acid esters and acrylic acid esters may be treated according to this invention to give improved heat resistance to the copolymers. Thus, copolymers of methyl methacrylate with one or more of the following are well adapted for treatment according to the present invention: ethyl acrylate, isobutyl methacrylate, phenyl methacrylate, methyl acrylate, n-butyl methacrylate, and ethyl methacrylate.

An advantage of the present invention is that it provides a very simple and economical method of improving the heat resistance of polymeric methyl methacrylate. Since the temperature of heat distortion of articles molded from these polymers is also increased, the invention is particularly valuable in its application to polymers to be used for molding. A further advantage is that the modified polymers made according to the invention may be molded without the necessity of adding mold lubricants to the polymers, thus avoiding the attendant decrease in the heat distortion temperature of articles molded therefrom. The modified polymers herein disclosed also have improved flow properties which permit the use of faster molding cycles, and give molded articles having improved optical properties.

As many apparently widely different embodiments of this invention may be made without departing from the spirit and scope thereof, it is to be understood that the invention is not limited to the specific embodiments thereof except as defined in the appended claims.

I claim:

1. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of an aliphatic mercaptan containing from 1 to 18 carbon atoms, inclusive, and maintaining said suspension containing said mercaptan at a temperature of from 100° C. up to a temperature of 30° C. below the flow temperature of said polymeric methyl methacrylate to increase the heat resistance of said polymeric methyl methacrylate.

2. Process of preparing modified polymeric methyl methacrylate which comprises adding to a suspension of finely-divided polymeric methyl methacrylate essentially composed of, by weight thereof, at last 80% methyl methacrylate and the remainder an ester from the group consisting of esters of acrylic and methacrylic acids, in an aqueous medium 0.1% to 2.5%, by weight of said polymeric methyl methacrylate, of an aliphatic mercaptan containing from 1 to 18 carbon atoms, inclusive, and maintaining said suspension containing said mercaptan at a temperature of from 100° C. up to a temperature of 30° C. below the flow temperature of said polymeric methyl methacrylate for a period of 5 minutes to 45 minutes.

3. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.2% to 0.5%, by weight of said polymeric methyl methacrylate, of an aliphatic mercaptan containing from 1 to 18 carbon atoms, inclusive, and maintaining said suspension containing said mercaptan at a temperature of 100° C. to 125° C. for a period of 5 minutes to 45 minutes.

4. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of lauryl mercaptan and maintaining said suspension containing said mercaptan at a temperature of from 100° C. up to a temperature of 30° C. below the flow temperature of said polymeric methyl methacrylate to increase the heat resistance of said polymeric methyl methacrylate.

5. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of lauryl mercaptan and maintaining said suspension containing said mercaptan at a temperature of from 100° C. up to a temperature of 30° C. below the flow temperature of said polymeric methyl methacrylate for a period of 5 minutes to 45 minutes.

6. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of an aliphatic mercaptan containing from 1 to 18 carbon atoms, inclusive, and thereafter agitating said suspension containing said mercaptan at a temperature of from 100° C. up to a temperature of 30° C. below the flow temperature of said polymeric methyl methacrylate, under autogenous pressure in a closed vessel to increase the heat resistance of said polymeric methyl methacrylate.

7. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of lauryl mercaptan and thereafter agitating said suspension containing said mercaptan at a temperature of from 100° C. up to a temperature of 30° C. below the flow temperature of said polymeric methyl methacrylate, under autogenous pressure in a closed vessel to increase the heat resistance of said polymeric methyl methacrylate.

8. Process of preparing modified polymeric methyl methacrylate which comprises adding to a suspension of finely-divided polymeric methyl methacrylate essentially composed of, by weight thereof, at least 80% methyl methacrylate and the remainder an ester from the group consisting of esters of acrylic and methacrylic acids, in an aqueous medium 0.1% to 2.5%, by weight of said polymeric methyl methacrylate, of an aliphatic mercaptan containing from 1 to 18 carbon atoms, inclusive, and maintaining said suspension containing said mercaptan at a temperature of 100° C. to 125° C. to increase the heat resistance of said polymeric methyl methacrylate.

JOSEPH L. QUINN.

REFERENCES CITED

The following references are of record in the file of this patent:

UNITED STATES PATENTS

| Number | Name | Date |
|---|---|---|
| 2,234,204 | Starkweather et al. | Mar. 11, 1941 |
| 2,346,107 | Johnson | Apr. 4, 1944 |
| 2,351,108 | Collins | June 13, 1944 |
| 2,362,052 | Craig | Nov. 7, 1944 |
| 2,380,475 | Stewart | July 31, 1945 |
| 2,384,070 | Bolton | Sept. 4, 1945 |
| 2,396,957 | Lazier et al. | Mar. 19, 1946 |
| 2,411,954 | Burke | Dec. 3, 1946 |

Certificate of Correction

Patent No. 2,462,895.

March 1, 1949.

JOSEPH L. QUINN

It is hereby certified that errors appear in the printed specification of the above numbered patent requiring correction as follows:

Column 2, lines 1 and 2, strike out "the copending application of"; column 3, line 13, Example II, for the words "as prepared" read *was prepared*; column 4, line 13, for "mercptan" read *mercaptan*; line 35, same column, for "in kettle" read *in the kettle*; column 6, line 60, claim 2, for "last" read *least*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*